United States Patent
Hara

(10) Patent No.: US 7,271,844 B2
(45) Date of Patent: Sep. 18, 2007

(54) FRAME SIGNAL PHASE ADJUSTER

(75) Inventor: Tomomi Hara, Kanagawa-ken (JP)

(73) Assignee: Leader Electronics Corporation, Yokohama-shi, Kanagawa-ken (JP)

( * ) Notice: Subject to any disclaimer, the term of this patent is extended or adjusted under 35 U.S.C. 154(b) by 540 days.

(21) Appl. No.: 10/943,885

(22) Filed: Sep. 20, 2004

(65) Prior Publication Data

US 2005/0078218 A1    Apr. 14, 2005

(30) Foreign Application Priority Data

Sep. 29, 2003  (JP) ............................. 2003-338226

(51) Int. Cl.
    *H03L 7/00* (2006.01)
(52) U.S. Cl. ...................... 348/547; 348/536
(58) Field of Classification Search ................ 348/547, 348/536, 537, 548, 526, 529
    See application file for complete search history.

(56) References Cited

U.S. PATENT DOCUMENTS

| 3,875,329 A | * | 4/1975 | Nagel ........................... 348/463 |
| 4,885,638 A | * | 12/1989 | Bennett ....................... 348/536 |
| 6,339,601 B1 | * | 1/2002 | Seong et al. ................. 370/503 |

* cited by examiner

*Primary Examiner*—Michael H. Lee
(74) *Attorney, Agent, or Firm*—Fish & Richardson P.C.

(57) ABSTRACT

A frame signal phase adjuster comprises units for inputting a parallel clock and a reference signal (22-4 and 22-1); generating a frame signal from the reference signal (22-1), adjusting a phase of the frame signal (22-3), generating an adjusted frame signal synchronized by the parallel clock from the parallel clock and the adjusted frame signal (22-4), generating a frame reset pulse signal based on the parallel clock and the adjusted frame signal synchronized by the parallel clock (22-2), and outputting the frame reset pulse signal (22-2). The unit (22-4) adjusts the phase of the frame signal so that the frame signal is constantly HIGH or LOW throughout a setup time and a hold time.

3 Claims, 13 Drawing Sheets

Fig. 11
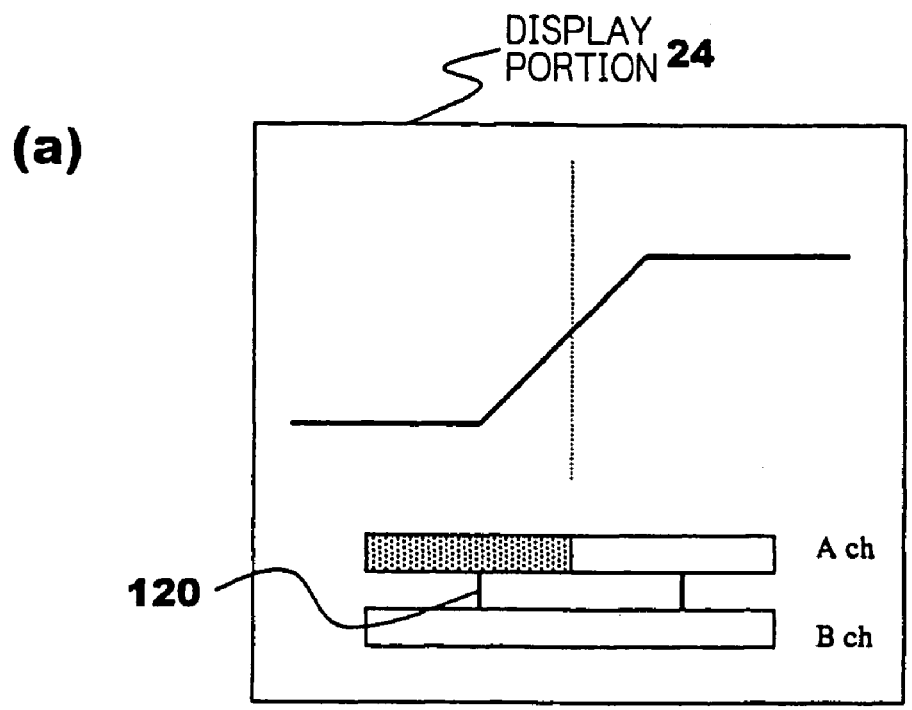
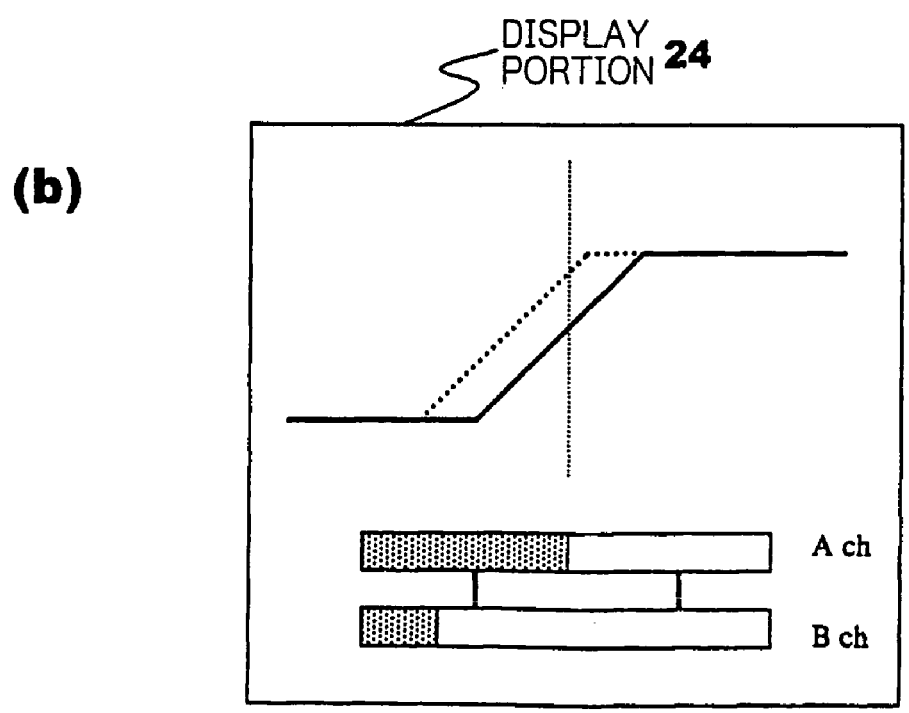

Fig. 13
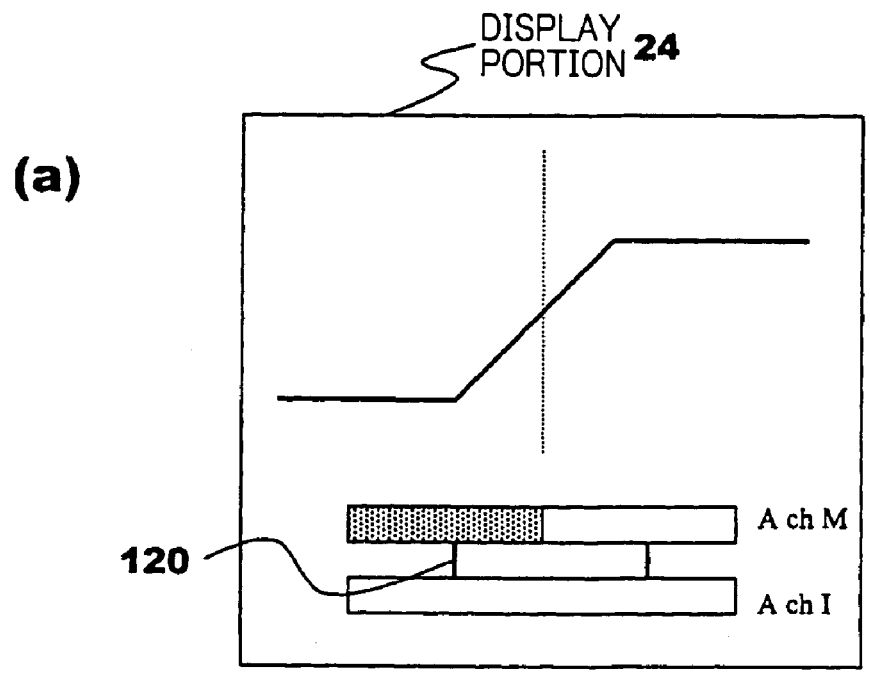
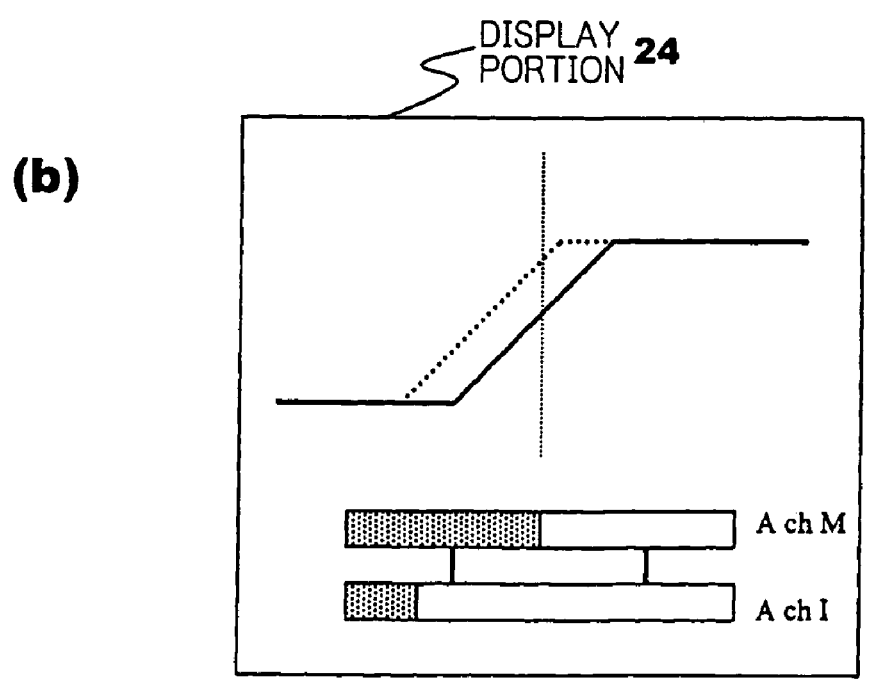

FRAME SIGNAL PHASE ADJUSTER

BACKGROUND OF THE INVENTION

The present invention generally relates to an apparatus for adjusting a phase of a frame signal in an external synchronization mode and for generating a frame reset pulse signal from the adjusted frame signal and a parallel clock (PCLK) of a video signal, and in particular, to an apparatus for preventing jitter when displaying a waveform of a SDI (Serial Digital Interface) video signal based on the frame reset pulse signal.

FIG. 1 represents a video signal waveform display apparatus 20 (a waveform monitor for instance) for inputting, from a video signal generator 12, a SDI video signal synchronized by a reference signal (EXT_REF, generally a black burst (BB) signal) from an external reference synchronizing signal generator 11, together with the reference signal (EXT_REF). As shown in FIG. 1, a SDI video signal waveform display apparatus 20 displays a waveform of SDI video signal from a SDI video signal generator 12 (a VTR or a camera for instance) in an external synchronization mode, that is, based on the external reference signal (EXT_REF). The SDI video signal waveform display apparatus 20 can input a SDI video signal from a SDI video signal generator 12A and a SDI video signal from a SDI video signal generator 12B and selects one of the SDI video signals so as to display the waveform of the selected SDI video signal based on the external reference signal (EXT_REF). It is possible, by using the same reference signal (EXT_REF) in the external synchronization mode, to grasp a phase difference between the SDI video signal (target signal) from the SDI video signal generator 12A and the SDI video signal (adjustment signal) from the SDI video signal generator 12B. Thereafter, it is possible, for the sake of eliminating the phase difference, to use a phase adjusting means (not shown) of the SDI video signal generator 12B for instance so as to adjust the phase of the SDI video signal outputted from the SDI video signal generator 12B. Thereby, it is possible to edit a plurality of SDI video signals.

Hereafter, operation of the SDI video signal waveform display apparatus 20 will be briefly described. First, a reference synchronizing signal generator 11 outside the waveform display apparatus 20 outputs a reference signal (EXT_REF signal, an analog signal) to the SDI video signal generator 12A. The SDI video signal generator 12A generates a SDI video signal (digital signal) synchronized based on the reference signal and outputs it to the SDI video signal waveform display apparatus 20, and also outputs the reference signal (analog signal) as it is to the SDI video signal generator 12B. The SDI video signal generator 12B generates a SDI video signal (digital signal) and outputs it to the SDI video signal waveform display apparatus 20 as with the SDI video signal generator 12A, and also outputs the reference signal (analog signal) as it is to the SDI video signal waveform display apparatus 20.

Next, the SDI video signal waveform display apparatus 20 can allow a user to select one of the inputted SDI video signals. The video signal selected by the user is inputted to a SDI video signal processing portion 21. The SDI video signal processing portion 21 inputs the SDI video signals from the SDI video signal generator 12 to generate a parallel clock (PCLK) from the SDI video signals. The SDI video signal processing portion 21 further generates parallel data based on the SDI video signals and the parallel clock (PCLK), and also outputs the parallel clock (PCLK) to an external reference synchronizing signal processing portion 22.

The external reference synchronizing signal processing portion 22 inputs the parallel clock (PCLK) from the SDI video signal processing portion 21 and the reference signal (analog signal: EXT_REF) outputted from the reference synchronizing signal generator 11 (SDI video signal generator 12B). FIG. 2 shows an example (prior art) of concretizing the external reference synchronizing signal processing portion 22 shown in FIG. 1. As shown in FIG. 2, the parallel clock (PCLK) from the SDI video signal processing portion 21 is inputted to a frame reset pulse generating circuit 22-2 of the external reference synchronizing signal processing portion 22. The reference signal (EXT_REF) from outside is inputted to a synchronizing separator circuit 22-1 of the external reference synchronizing signal processing portion 22. The synchronizing separator circuit 22-1 generates a frame signal (FRM) from the reference signal (EXT_REF), and outputs the frame signal (FRM) to the frame reset pulse generating circuit 22-2. The frame reset pulse generating circuit 22-2 generates a frame signal synchronized by the parallel clock from the parallel clock (PCLK) and the frame signal (FRM), and generates a frame reset pulse signal (FRM_RESET) based on the parallel clock (PCLK) and the frame signal synchronized by the parallel clock so as to output the frame reset pulse signal to the SDI video signal processing portion 21.

Returning to FIG. 1, the SDI video signal processing portion 21 uses the frame reset pulse signal as video output timing, and outputs the parallel data to a SDI video signal display processing portion 23 with the parallel clock (PCLK).

The SDI video signal display processing portion 23 processes the parallel data with the frame reset pulse signal and the parallel clock (PCLK) to generate waveform signal data for displaying a waveform of the SDI video signal. The SDI video signal display processing portion 23 outputs the waveform signal data to a display portion 24 (a display for instance) so that the SDI video signal is displayed as waveform on the display portion 24. The SDI video signal display processing portion 23 can also process the parallel data to create video signal data for displaying the video of the SDI video signal. In the case where a video display mode of the SDI video signal is selected by the user, the SDI video signal display processing portion 23 outputs the video signal data to the display portion 24 so that the SDI video signal is displayed as video on the display portion 24.

SUMMARY OF THE INVENTION

As described above, a frame reset pulse generating circuit 22-2 of an external reference synchronizing signal processing portion 22 generates a frame reset pulse signal (FRM_RESET) based on a parallel clock (PCLK) and a frame signal (FRM). The frame reset pulse generating circuit 22-2 is generally constituted by using a D type FF (flip-flop) in which a setup time (Tsu) and a hold time (Th) exist for stably generating the frame reset pulse signal.

FIG. 3 is a diagram for explaining the setup time (Tsu) and hold time (Th). As shown in FIG. 3, the setup time (Tsu) is a predetermined period (4 ns for instance), with reference to a rise time when the parallel clock (PCLK) changes from LOW (0) to HIGH (1), from a time before the rise time to the rise time. The hold time (Th) is a predetermined period (2 ns for instance), with reference to the rise time from LOW to HIGH of the parallel clock, from the rise time to a time after the rise time.

As shown in FIG. 3, in the case where, for instance, the frame signal (FRM) is constantly HIGH (1) (arrow 30) or in the case where the frame signal (FRM) is constantly LOW (0) (arrow 31) throughout a set of the setup time (Tsu) and hold time (Th), the frame reset pulse generating circuit 22-2 can generate a stable frame reset pulse signal. However, in the case where, for instance, the frame signal (FRM) changes from HIGH (1) to LOW (0) (arrow 32) or in the case where the frame signal (FRM) changes from LOW (0) to HIGH (1) (arrow 33) through a set of the setup time (Tsu) and hold time (Th), the frame reset pulse generating circuit 22-2 generates an unstable frame reset pulse signal.

FIG. 4(a) represents a SDI video signal waveform displayed based on a constantly stable frame reset pulse signal, and FIG. 4(b) represents a SDI video signal waveform displayed based on the frame reset pulse signals including an unstable frame reset pulse signal and a stable frame reset pulse signal.

In the case where the frame signal (FRM) is constantly HIGH or LOW through all the sets of the setup times (Tsu) and hold times (Th), a SDI video signal is normally displayed as waveform, as shown in FIG. 4(a).

However, in the case where the frame signal (FRM) is not constantly HIGH or LOW through a certain set of the setup time (Tsu) and hold time (Th), a SDI video signal is displayed in an abnormal waveform (arrow 40) and a normal waveform, as shown in FIG. 4(b). To be more specific, in the case where the frame signal (FRM) changes from LOW to HIGH or from HIGH to LOW through a certain set of the setup time (Tsu) and hold time (Th), the frame reset pulse signal corresponding to the setup time (Tsu) or the hold time (Th) becomes an unstable signal. Consequently, the waveform of the SDI video signal (arrow 40) which moves just by one dot to the right or left is displayed. For that reason, the abnormal waveform and normal waveform are alternately displayed, and the waveform of the SDI video signal looks as if jittering to a user. In such a situation, it is not possible to correctly grasp a phase difference between the SDI video signal from a SDI video signal generator 12A and the SDI video signal from a SDI video signal generator 12B.

An object of the present invention is to properly adjust a phase relationship between the parallel clock (PCLK) and the frame signal (FRM).

Another object of the present invention is to generate the stable frame reset pulse signal.

A further object of the present invention is to provide an apparatus for avoiding jitter when displaying a waveform of a video signal.

A still further object of the present invention will become clear by referring to embodiments of the invention described below.

A frame signal phase adjuster of the present invention comprises:

first means (21) comprising: means for inputting a SDI video signal and a frame reset pulse signal; means for generating a parallel clock from the SDI video signal; means for generating parallel data based on the SDI video signal and the parallel clock; means for using the frame reset pulse signal as video output timing to output the parallel data with the parallel clock; and means for outputting the parallel clock, and second means (22) comprising: means for inputting the parallel clock and a reference signal; means for generating a frame signal from the reference signal; means for adjusting a phase of the frame signal; means for generating an adjusted frame signal synchronized by the parallel clock from the parallel clock and the adjusted frame signal; means for generating a frame reset pulse signal based on the parallel clock and the adjusted frame signal synchronized by the parallel clock; and means for outputting the frame reset pulse signal.

The means for adjusting a phase of the frame signal of the second means (22) adjusts the phase of the frame signal so that the frame signal will constantly be HIGH or LOW through the setup time and hold time of the means for generating a frame reset pulse signal. To be more precise, the means for adjusting a phase of the frame signal of the second means (22) adjusts the phase of the frame signal so that a time when the frame signal changes from HIGH to LOW or LOW to HIGH exists in a stable area.

The setup time is a predetermined first period, with reference to a rise time from LOW to HIGH of the parallel clock, from a time before the rise time to the rise time; the hold time is a predetermined second period, with reference to the rise time from LOW to HIGH of the parallel clock, from the rise time to a time after the rise time; and the stable area is a period from an ending time of the hold time to a starting time of the setup time following the hold time.

BRIEF DESCRIPTION OF THE DRAWINGS

FIG. 11(a) represents an example of visualizing a positional status signal (D_FRM_STATUS) on Ach and FIG. 11(b) shows an example of visualizing the positional status signals (D_FRM_STATUS) on Ach and Bch;

FIG. 13(a) shows an example of visualizing the positional status signal (D_FRM_STATUS) on a target signal, and FIG. 13(b) shows an example of visualizing the positional status signals (D_FRM_STATUS) on the target signal and adjustment signal.

DETAILED DESCRIPTION OF THE INVENTION

Figure 1:
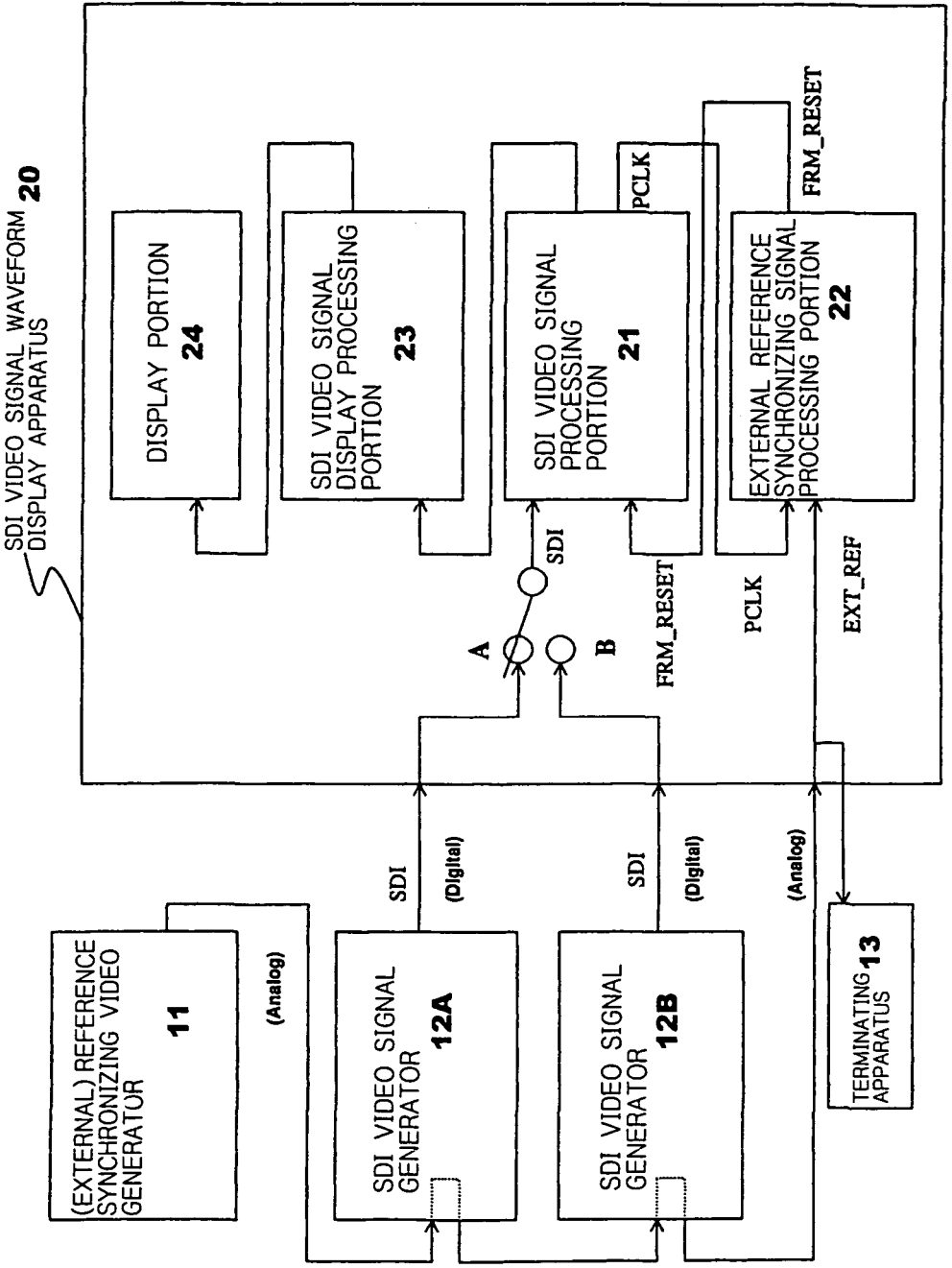
FIG. 1 represents a SDI video signal waveform display apparatus for inputting a SDI video signal from a SDI video signal generator and a reference signal for synchronization from an external reference synchronizing signal generator.

Hereafter, embodiments of the present invention will be described by referring to the drawings.

Figure 5:
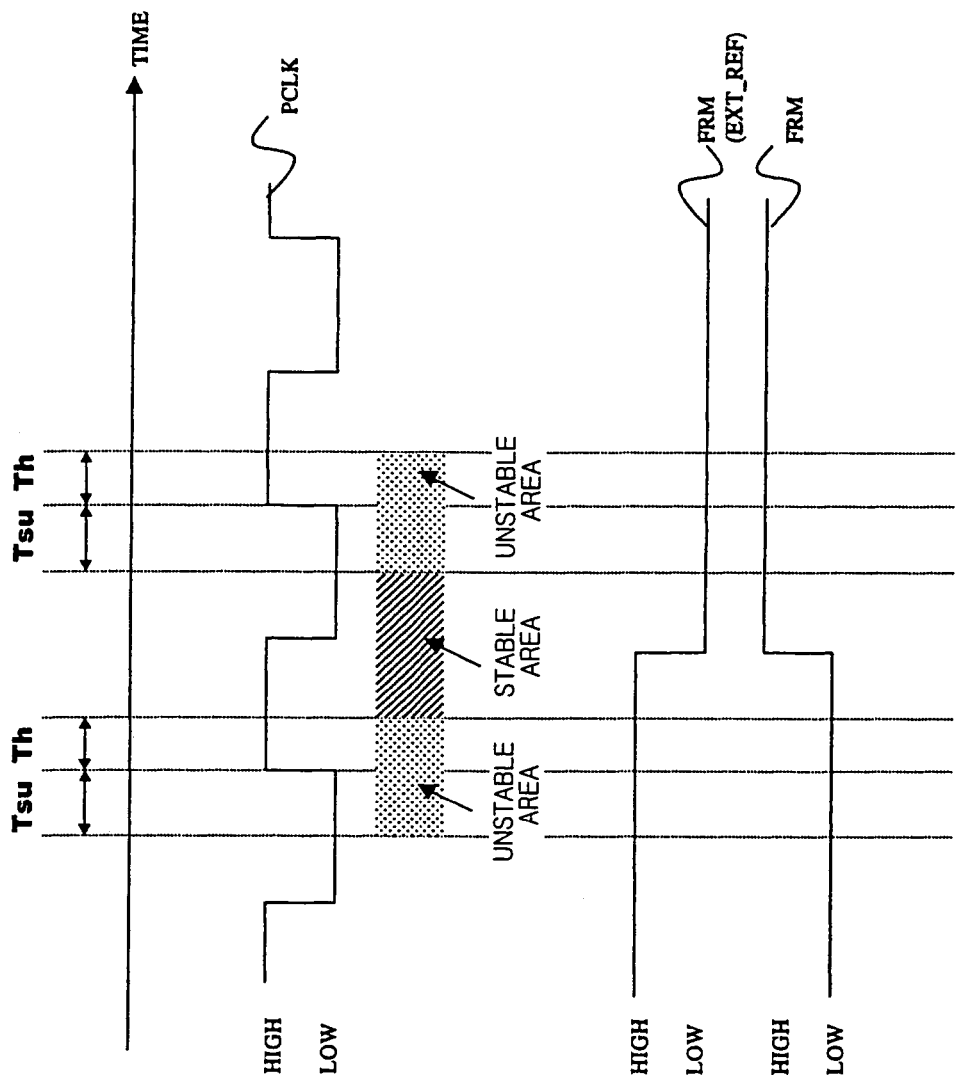
FIG. 5 is a diagram for explaining a stable area and an unstable area.

FIG. 5 is a diagram for explaining a stable area and an unstable area. As shown in FIG. 5, to keep a frame signal at HIGH or LOW constantly through all the sets of setup times and hold times, the time when the frame signal changes from HIGH to LOW or the time when it changes from LOW to HIGH should exist in the stable area existing between a set of the setup time and hold time and another set of the setup time and hold time. To be more specific, the time when the frame signal changes from HIGH to LOW (or LOW to HIGH) should exist in the stable area (a period from an ending time of the hold time to a starting time of the setup time following the hold time).

Figure 2:
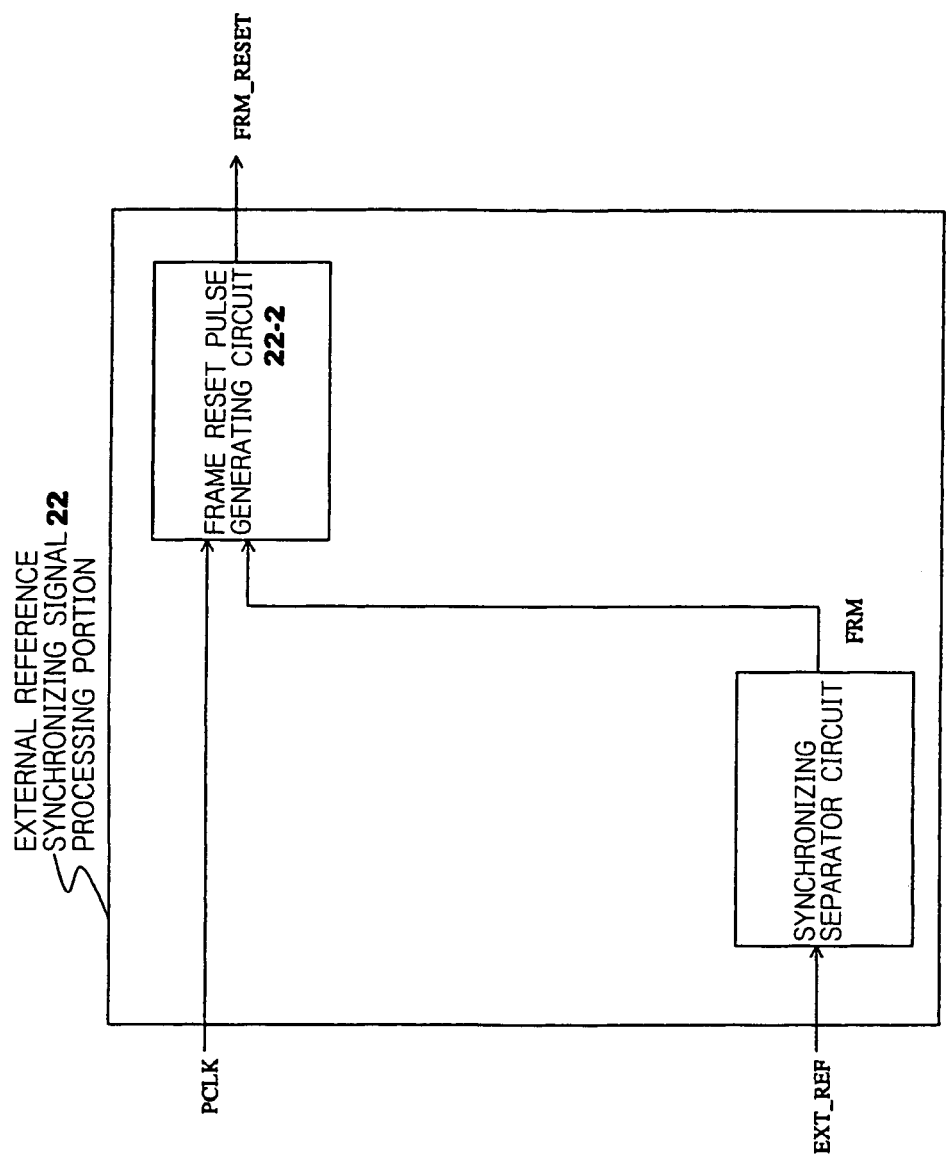
FIG. 2 shows an example (prior art) of concretizing an external reference synchronizing signal processing portion 22 shown in FIG. 1.
Figure 3:
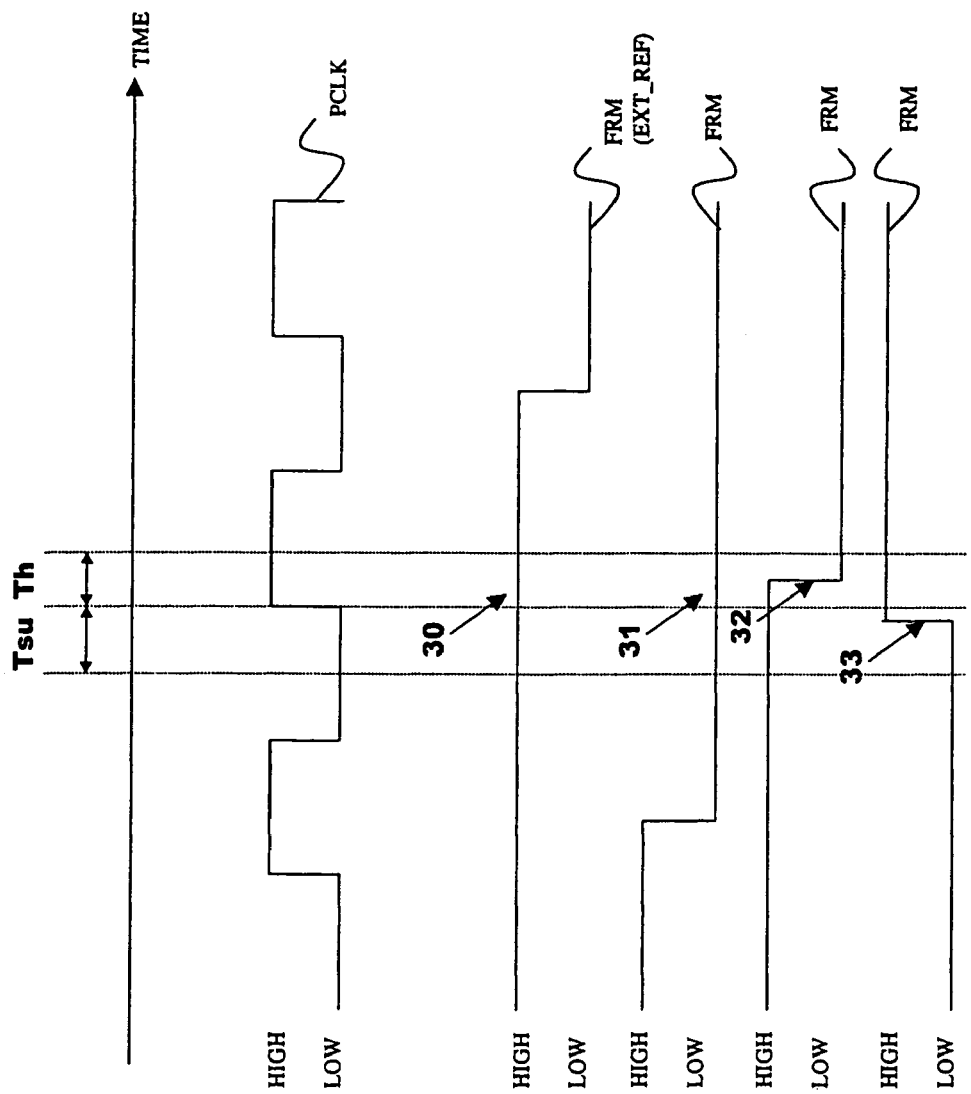
FIG. 3 is a diagram for explaining a setup time (Tsu) and a hold time (Th)
Figure 4:
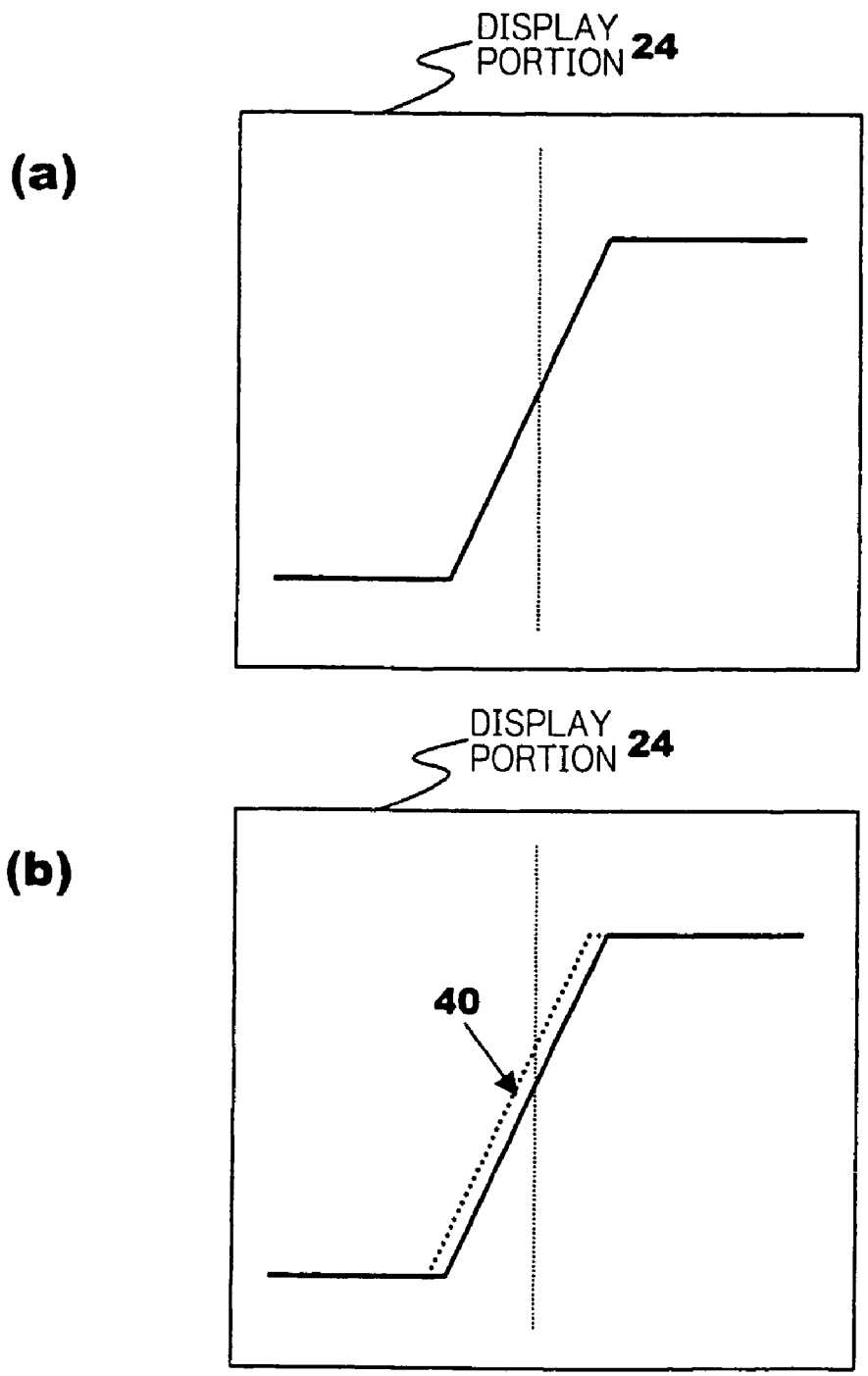
FIG. 4(a) represents a SDI video signal waveform displayed based on a constantly stable frame reset pulse signal.
FIG. 4(b) represents the SDI video signal waveform displayed based on the frame reset pulse signals including an unstable frame reset pulse signal and a stable frame reset pulse signal.
Figure 6:
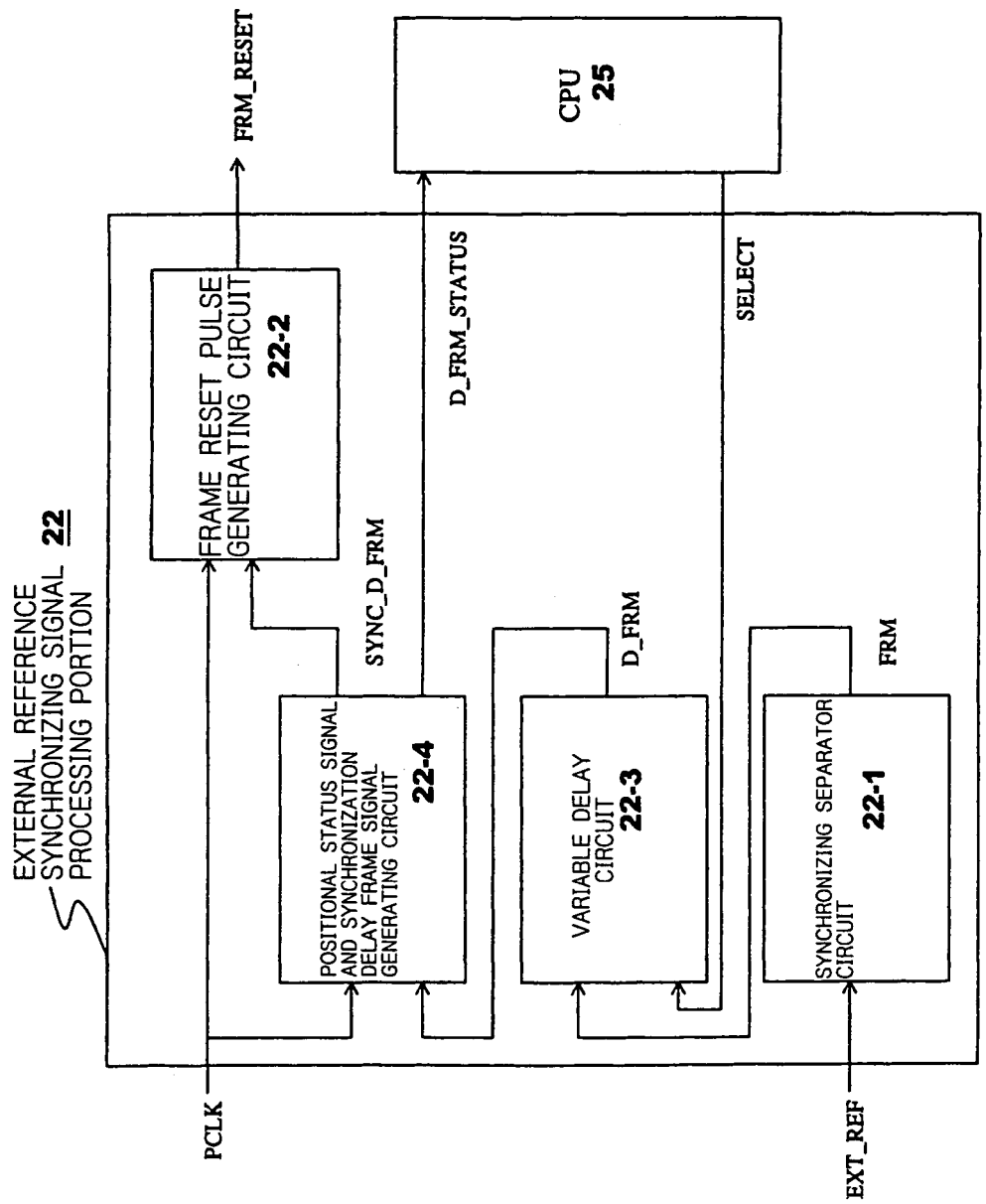
FIG. 6 shows an example (the present invention) of concretizing the external reference synchronizing signal processing portion 22 shown in FIG. 1.

FIG. 6 shows an example (the present invention) of concretizing the external reference synchronizing signal processing portion 22 shown in FIG. 1. In comparison to a synchronizing signal processing portion (prior art) shown in FIG. 2, the external reference synchronizing signal processing portion 22 according to the present invention further comprises a variable delay circuit 22-3 and a positional status signal and synchronization delay frame signal generating circuit 22-4. In comparison to a CPU according to the prior art, a CPU 25 according to the present invention further comprises a function of determining a positional status of the frame signal and a function of adjusting a delay amount of the frame signal. The frame reset pulse generating circuit 22-2 shown in FIG. 6 does not generate the frame signal synchronized by a parallel clock from the parallel clock (PCLK) and the frame signal (FRM) inside it but uses a delay frame signal (SYNC_D_FRM) synchronized by the parallel clock instead of the frame signal synchronized by the parallel clock.

Figure 7:
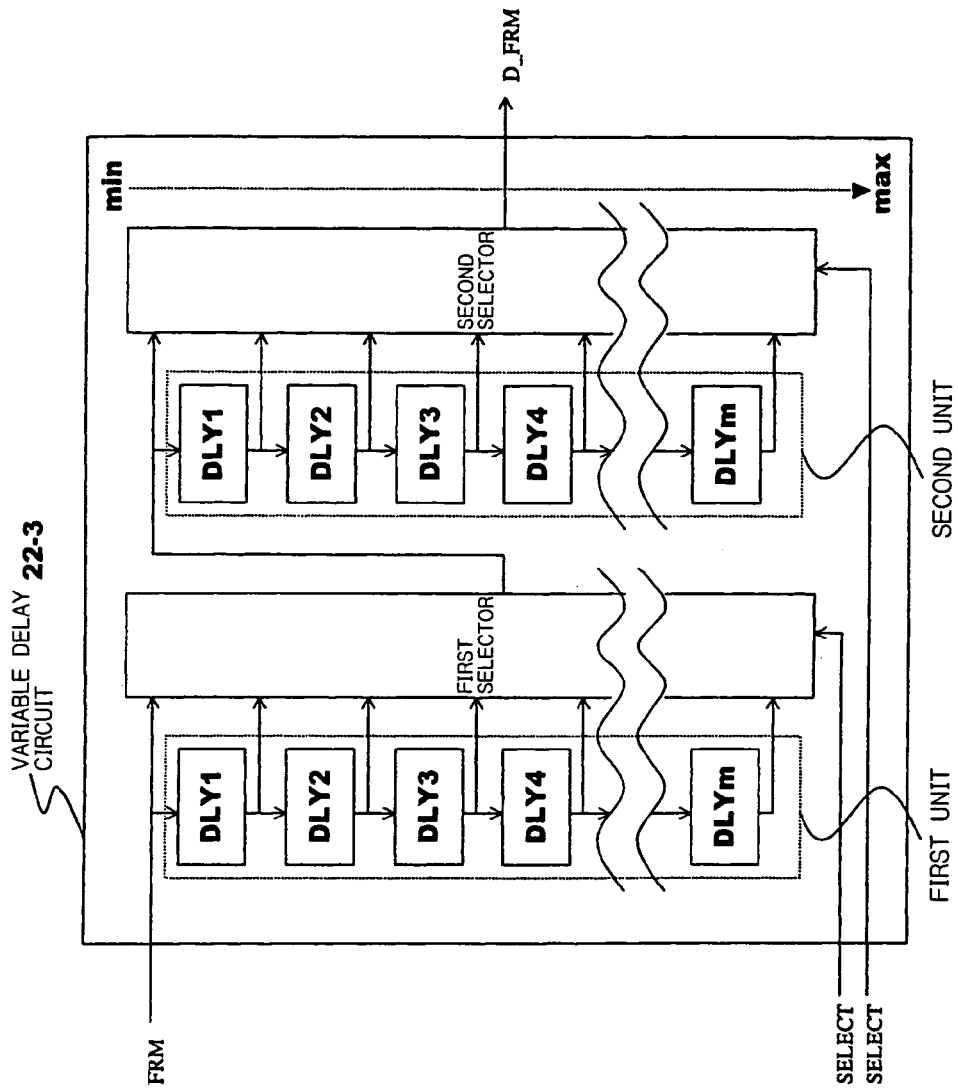
FIG. 7 shows an example (the present invention) of concretizing a variable delay circuit 22-3 shown in FIG. 6.

The variable delay circuit 22-3 of the external reference synchronizing signal processing portion 22 inputs a frame signal (FRM) from a synchronizing separator circuit 22-1 and a delay amount selection signal (SELECT) from the CPU 25 so as to adjust a phase of the frame signal (FRM). FIG. 7 shows an example (the present invention) of concretizing the variable delay circuit 22-3 shown in FIG. 6. As shown in FIG. 7, the frame signal (FRM) from the synchronizing separator circuit 22-1 is inputted to a delay circuit (DLY 1) of a first unit and a first selector. The phase of the frame signal (FRM) inputted to the delay circuit (DLY 1) of the first unit is delayed by a delay time of the delay circuit.

This delay time depends on a cycle of the parallel clock (PCLK: refer to FIG. 6 or FIG. 1) inputted to the external reference synchronizing signal processing portion 22, and the cycle of the parallel clock depends on the kind of SDI video signal (refer to FIG. 1) inputted to a SDI video signal processing portion 21. In the case where the kind of SDI video signal is an HD-SDI (High-Definition Serial digital Interface) video signal, the cycle of the parallel clock is 13.5 ns. Since the delay time of the delay circuits (DLY 1 to DLY m) in FIG. 7 is set to a time shorter than the cycle of the parallel clock (13.5 ns), the delay time is 1.3 ns as about a tenth of the cycle, for instance. And a provisional total delay amount of the delay circuits (DLY 1 to DLY m) of the first unit or the second unit is 1.5 times of the cycle of the parallel clock (13.5 ns) for instance. To be more specific, in the case where the delay time of the delay circuit is 1.3 ns and the provisional total delay amount of the delay circuits (DLY 1 to DLY m) is 20.25 ns (13.5 ns×1.5), the total number (m) of the delay circuits (DLY 1 to DLY m) of each of the first unit and the second unit is 16 (20.25 ns/1.3 ns=15.58). The true total delay amount of the delay circuits (DLY 1 to DLY 16) is 20.8 ns (1.3 ns×16).

Therefore, the phase of the frame signal (FRM) inputted to the delay circuit (DLY 1) of the first unit, for instance, is delayed by the delay time of the delay circuit (1.3 ns). The frame signal delayed just by 1.3 ns compared to the frame signal (FRM) from the synchronizing separator circuit 22-1 is inputted to the delay circuit (DLY 2) of the first unit and the first selector as shown in FIG. 7. The phase of the frame signal (FRM) inputted to the delay circuit (DLY 2) of the first unit is delayed by the delay time of the delay circuit (1.3 ns). As such, each of the frame signals is delayed by the delay time (1.3 ns), and 17 frame signals in total are inputted to the first selector. To be more specific, the 17 frame signals in total having a delay interval of 1.3 ns are generated by the delay circuits (DLY 1 to DLY 16) of the first unit. And it is possible, by selecting a desired frame signal out of the frame signals inputted to the first selector, to adjust the phase of the frame signal from a synchronizing separator circuit 22-1. As for a "first initial value", the delay frame signal (delay frame signal outputted from an eighth delay circuit from top (DLY 8)) corresponding to a median (9) of the total number (17) of the delay frame signals inputted to the first selector is selected as the desired frame signal. In other words, the CPU 25 outputs as the first initial value a first selection signal (SELECT) to the first selector so that the first selector selects the delay frame signal corresponding to the median (9) of the total number (17) of the delay frame signals inputted to the first selector.

The delayed frame signal from the first selector (delay frame signal outputted from the eighth delay circuit from top (DLY 8)) is inputted to a delay circuit (DLY 1) of a second unit and a second selector. The phase of the frame signal inputted to the delay circuit (DLY 1) of the second unit is delayed by the delay time of the delay circuit (1.3 ns). As with the delay circuits (DLY 1 to DLY 16) of the first unit, each of the frame signals is delayed by the delay time (1.3 ns) by the delay circuits (DLY 1 to DLY 16) of the second unit, and 17 frame signals in total are inputted to the second selector. It is possible, by selecting a desired frame signal out of the frame signals inputted to the second selector, to adjust the phase of the frame signal from the first selector. As for a "second initial value", the delay frame signal (delay frame signal outputted from the eighth delay circuit from top (DLY 8)) corresponding to a median (9) of the total number (17) of the delay frame signals inputted to the second selector is selected as the desired frame signal. In other words, the CPU 25 outputs as the second initial value a second selection signal (SELECT) to the second selector so that the second selector selects the delay frame signal corresponding to the median (9) of the total number (17) of the delay frame signals inputted to the second selector. Thus, the variable delay circuit 22-3 outputs the delay frame signal (D_FRM) having a total delay amount of 20.8 ns (=1.3 ns×(8+8)) against the frame signal (FRM) from a synchronizing separator circuit 22-1.

Figure 8:
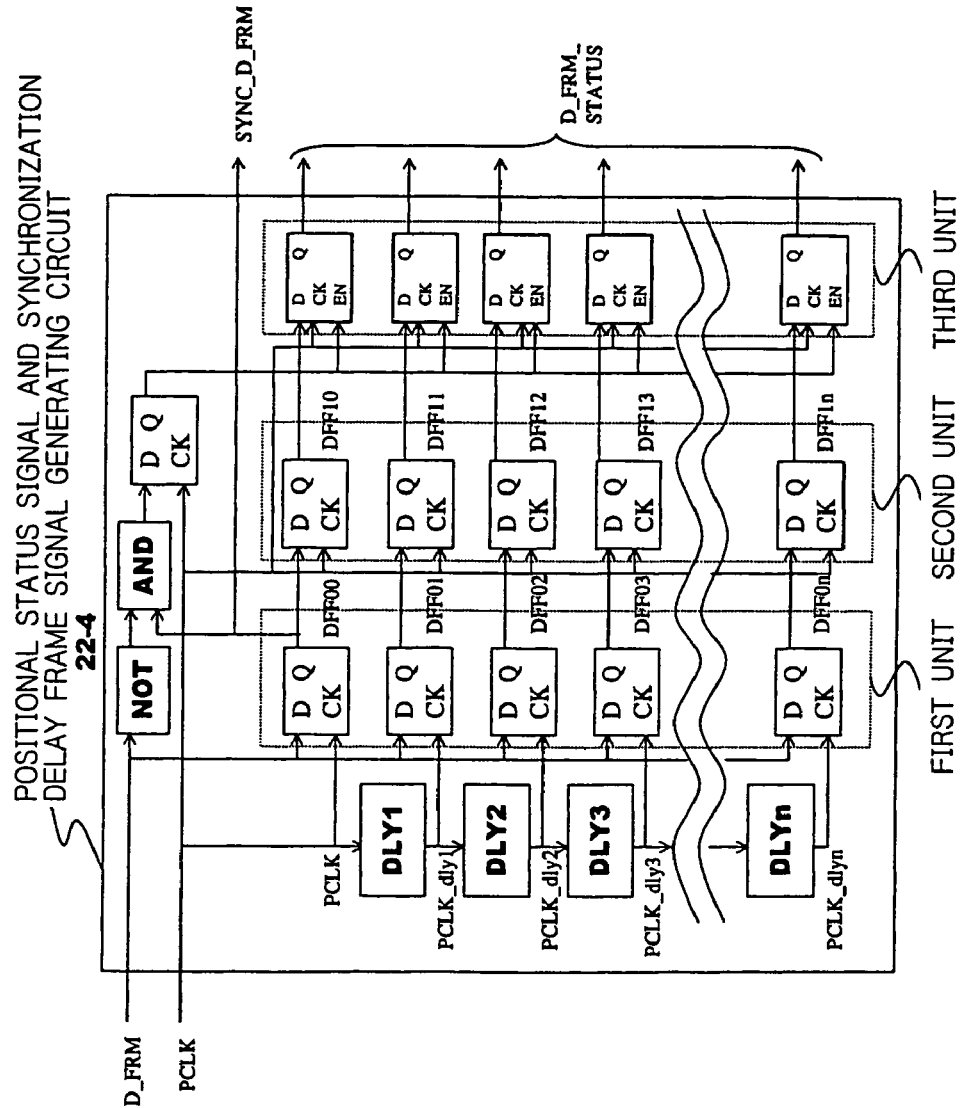
FIG. 8 shows an example (the present invention) of concretizing a positional status signal and synchronization delay frame signal generating circuit 22-4 shown in FIG. 6.

Returning to FIG. 6, the circuit 22-4 of the external reference synchronizing signal processing portion 22 inputs the delay frame signal (D FRM) from the variable delay circuit 22-3 and the parallel clock (PCLK: refer to FIG. 1) from the SDI video signal processing portion 21. And it generates a positional status signal (D_FRM_STATUS) for representing where a time for the delay frame signal (D_FRM) to change from HIGH to LOW exists with reference to a rise time from LOW to HIGH of the parallel clock (PCLK). The circuit 22-4 further generates a delay frame signal (SYNC_D_FRM) synchronized by the parallel clock (PCLK). FIG. 8 shows an example (the present invention) of concretizing the positional status signal and synchronization delay frame signal generating circuit 22-4 shown in FIG. 6.

As shown in FIG. 8, the parallel clocks (PCLKs) from the SDI video signal processing portion 21 are inputted to the delay circuit (DLY 1), each of D type FFs (flip-flops) and each of D type FFs (flip-flops) having an enable function. The phase of the parallel clock (PCLK) inputted to the delay circuit (DLY 1) is delayed by the delay time of the delay circuit. The delay time depends on the number of samplings of the delay frame signal (D_FRM) in the cycle of the parallel clock (13.5 ns). Therefore, in the case where the number of samplings is set to 10 for instance, the delay time of the delay circuits (DLY 1 to DLY n) in FIG. 8 is 1.3 ns as about a tenth of the cycle of the parallel clock (13.5 ns). And the total number n of the delay circuits (DLY 1 to DLY n) is 9 (the number of samplings—1). Thus, each of the parallel clocks (PCLKs) is delayed by the delay time (1.3 ns), and 10 parallel clocks (PCLKs) in total are inputted to the 10 D type FFs of the first unit.

As shown in FIG. 8, the delay frame signal (D_FRM) from the variable delay circuit 22-3 is inputted to a NOT circuit and the 10 D type FFs of the first unit. Output signals of the 10 D type FFs of the first unit are inputted to the 10 D type FFs of the second unit. The output signals of the 10 D type FFs of the second unit are inputted to the 10 D type FFs of the third unit having the enable function. Note that the output signal of the top D type FF of the first unit is the delay frame signals (SYNC_D_FRMs) synchronized by the parallel clock (PCLK), and is inputted to an AND circuit (FIG. 8) and the frame reset pulse generating circuit 22-2 (refer to FIG. 6).

The output signal of the NOT circuit is inputted to the AND circuit. The output signal of the AND circuit is inputted to a D type FF connected to the AND circuit. The output signal of the D type FF connected to the AND circuit is inputted as enable signals to the D type FFs of the third unit having the enable function.

Figure 9:
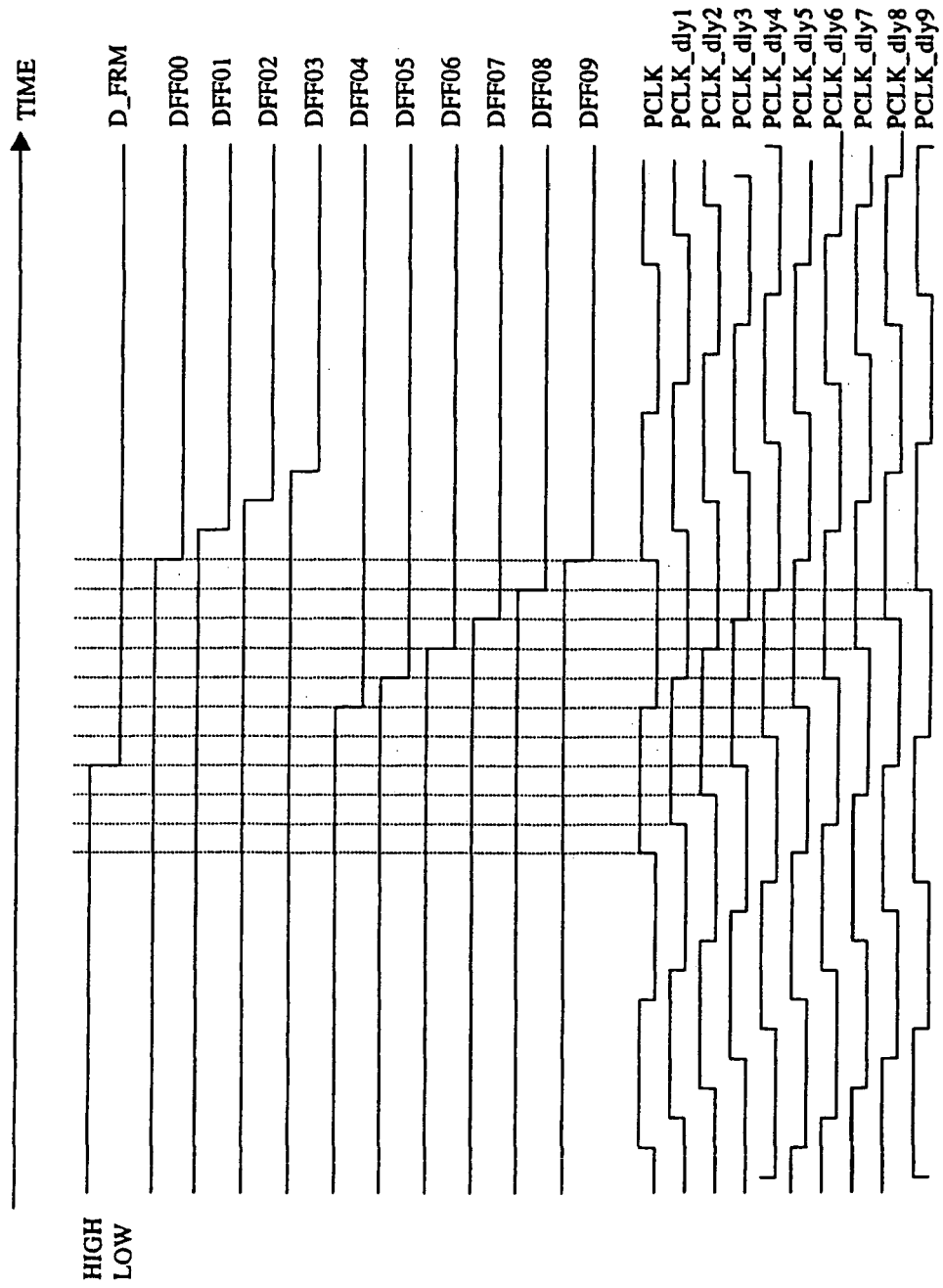
FIG. 9 represents a delay frame signal (D_FRM) inputted to the circuit 22-4 from the circuit 22-3, output signals (DFF 00 to DFF 09) of the 10 D type FFs of the first unit in the circuit 22-4 shown in FIG. 8, parallel clocks (PCLKs) inputted to the circuit 22-4 from a video signal processing portion 21, and the parallel clocks (PCLK_dly 1 to PCLK_dly 9) outputted from delay circuits (DLY 1 to DLY n) in the circuit 22-4 shown in FIG. 8.

FIG. 9 represents the delay frame signal (D_FRM) inputted to the circuit 22-4 from the circuit 22-3, the output signals (DFF 00 to DFF 09) of the 10 D type FFs of the first unit in the circuit 22-4 shown in FIG. 8, the parallel clock (PCLK) inputted to the circuit 22-4 from the video signal processing portion 21, and the parallel clocks (PCLK-dly 1 to PCLK-dly 9) outputted from the delay circuits (DLY 1 to DLY n) in the circuit 22-4 shown in FIG. 8. The outputs of the 10 D type FFs of the third unit having the enable function in the circuit 22-4 shown in FIG. 8 represent positional information on the delay frame signal (D_FRM) shown in FIG. 9. To be more specific, the output of the D type FF of the top of the third unit having the enable function represents HIGH (a status of the delay frame signal (D_FRM) at the rise time from LOW to HIGH of the parallel clock (PCLK)). The output of the second D type FF of the third unit having the enable function represents HIGH (a status of the delay frame signal (D_FRM) when 1.3 ns elapsed from the rise time from LOW to HIGH of the parallel clock (PCLK)). Likewise, the output of the third D type FF of the third unit having the enable function represents HIGH, the output of the fourth D type FF having the enable function represents HIGH, and each of the outputs of the fifth to tenth D type FF having the enable function represents LOW. As such, the circuit 22-4 having the configuration shown in FIG. 8 can generate the positional status signal (D_FRM_STATUS) for representing where a time for the delay frame signal (D_FRM) to change from HIGH to LOW is located with reference to the rise time from LOW to HIGH of the parallel clock (PCLK).

The CPU 25 inputs the positional status signal (D_FRM_STATUS), and determines where the time for the delay frame signal (D_FRM) to change from HIGH to LOW is located with reference to the rise time from LOW to HIGH of the parallel clock (PCLK). In the case where a phase difference between the delay frame signal (D_FRM) outputted from the variable delay circuit 22-3 and the parallel clock (PCLK) outputted from the video signal processing portion 21 is in the relationship shown in FIG. 9, the CPU 25 determines that the time for the delay frame signal (D_FRM) to change from HIGH to LOW is past the rise time from LOW to HIGH of the parallel clock (PCLK) just by 5.2 ns (1.3 ns×4). To be more specific, the CPU 25 determines that elapsed time is 5.2 ns.

Next, the CPU 25 determines whether or not the elapsed time (difference between the time for the delay frame signal (D_FRM) to change from HIGH to LOW and the rise time from LOW to HIGH of the parallel clock (PCLK)) exists in the stable area. As shown in FIG. 5, the stable area is the period from the ending time of the hold time to the starting time of the setup time following the hold time. In the case where the hold time (Th) is 2.0 ns, the cycle of the parallel clock (PCLK) is 13.5 ns, and the setup time (Tsu) is 4.0 ns, the stable area is the period from 2.0 ns to 9.5 ns (13.5 ns−4.0 ns). In the example shown in FIG. 9, the elapsed time (5.2 ns) is in the stable area (2.0 ns to 9.5 ns), and so the CPU 25 determines that the elapsed time is in the stable area. In the case where the elapsed time is in the stable area, it is possible to generate a stable frame reset pulse signal so that the CPU 25 does not need to change the first initial value of the first selection signal (SELECT). However, each of the setup time (Tsu) and hold time (Th) depends on temperature of the frame reset pulse generating circuit 22-2 (D type FF (flip-flop)). Consequently, there might be the cases where, even if the elapsed time is in the stable area, the elapsed time would move on to the unstable area due to a change in the temperature and so on. Thus, to minimize influence of the change in the setup time (Tsu) and hold time (Th), the CPU 25 preferably brings the elapsed time (5.2 ns) closer to a center (9.5 ns−2.0 ns=7.5 ns) of the stable area. Therefore, the CPU 25 preferably outputs as a "first calibration value" the first selection signal (SELECT) to the first selector so that the first selector selects the delay frame signal corresponding to a value (11) in which 2 is added to the median (9) of the total number (17) of the delay frame signals. Thus, the phase of the delay frame signal (D_FRM) outputted from the variable delay circuit 22-3 is further delayed just by 2.0 ns, and consequently the elapsed time of the delay frame signal (D_FRM) against the parallel clock (PCLK) becomes 7.2 ns from 5.2 ns. It is thereby possible to minimize the influence of the change in the setup time (Tsu) and hold time (Th).

Thereafter, from the positional status signal (D_FRM_STATUS) the CPU 25 continues to determine where the time for the delay frame signal (D_FRM) to change from HIGH to LOW is located with reference to the rise time from LOW to HIGH of the parallel clock (PCLK), and also continues to determine whether or not the elapsed time (difference between the time for the delay frame signal (D_FRM) to change from HIGH to LOW and the rise time from LOW to HIGH of the parallel clock (PCLK)) exists in the stable area. The reason is that even if the elapsed time (5.2 ns) is brought closer to the center (9.5 ns–2.0 ns=7.5 ns) of the stable area once, there might be the cases where the elapsed time would get closer to the unstable area due to a change in the temperature and so on. To be more specific, there might be the cases where the elapsed time would get closer to 2.0 ns (an end of the stable area) or 9.5 ns (the other end of the stable area). Thus, the elapsed time is preferably brought closer to the center (9.5 ns–2.0 ns=7.5 ns) of the stable area. Therefore, in the cases where the elapsed time gets closer to the unstable area, the CPU 25 controls as a "second calibration value" the second selection signal (SELECT) of the second selector so as to bring the elapsed time closer to the center of the stable area.

Note that it is also possible to omit the delay circuits (DLY 1 to DLY m) of the second unit and the second selector of the variable delay circuit 22-3 shown in FIG. 7 and output from the first selector may be used as the delay frame signal (D_FRM).

Returning to FIG. 6, the frame reset pulse generating circuit 22-2 generates a frame reset pulse signal (FRM_RESET) based on the parallel clock (PCLK) and the delay frame signal (SYNC_D_FRM) synchronized by the parallel clock so as to output the frame reset pulse signal to the SDI video signal processing portion 21.

Figure 10:
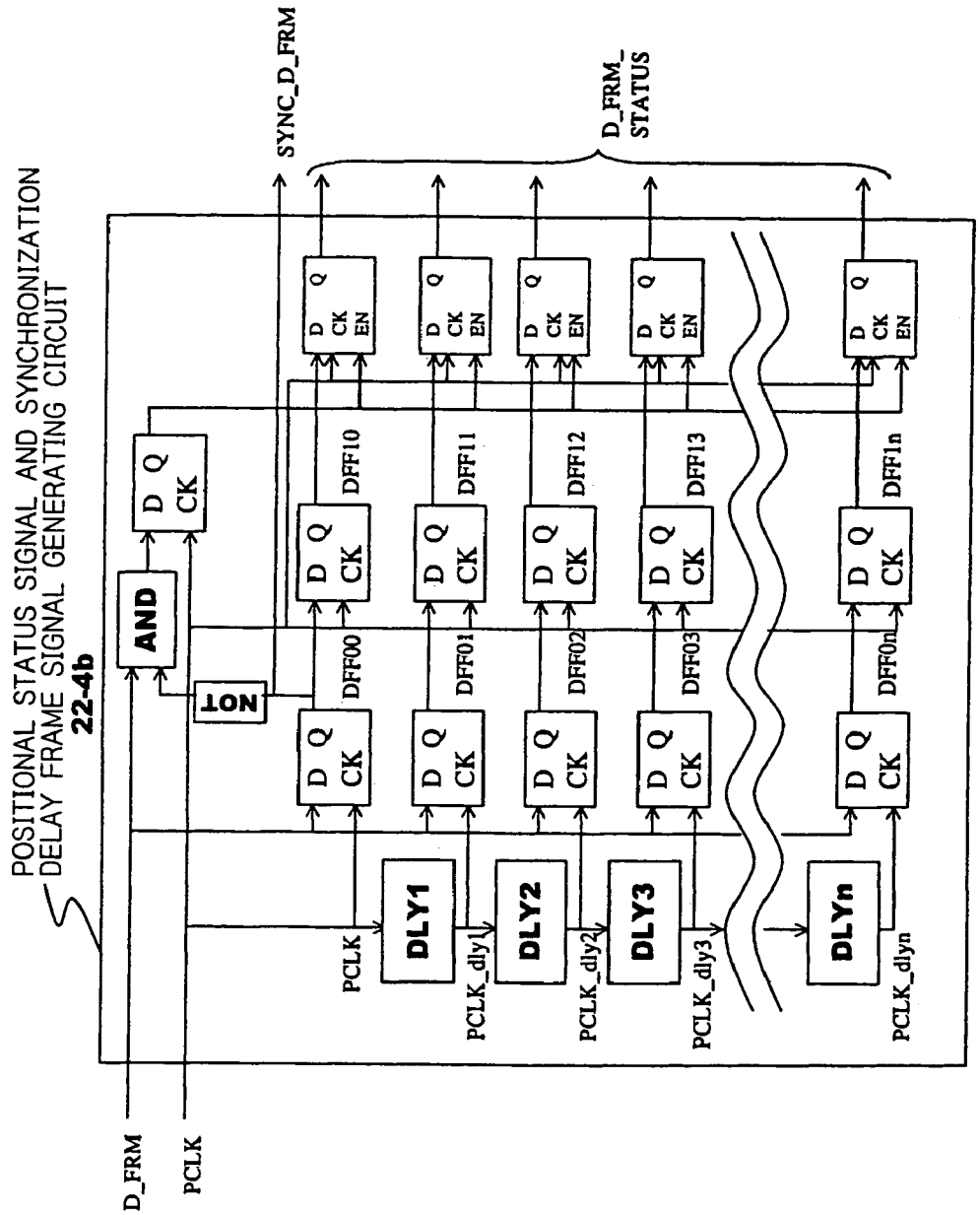
FIG. 10 shows another example (the present invention) of concretizing the positional status signal and synchronization delay frame signal generating circuit 22-4 shown in FIG. 6.

FIG. 10 shows another example (the present invention) of concretizing the positional status signal and synchronization delay frame signal generating circuit 22-4 shown in FIG. 6. The NOT circuit of the circuit 22-4 shown in FIG. 8 inputs the delay frame signal (D_FRM) and outputs an inversion signal of the signal to the AND circuit, while a NOT circuit of a circuit 22-4b shown in FIG. 10 inputs the synchronized delay frame signal (SYNC_D_FRM) and outputs an inversion signal of the signal to the AND circuit. As it is thus constituted, the circuit 22-4b having the configuration shown in FIG. 10 can generate the positional status signal (D_FRM_STATUS) for representing where the time for the delay frame signal (D_FRM) to change from "LOW" to "HIGH" is located with reference to the rise time from LOW to HIGH of the parallel clock (PCLK). Therefore, the CPU 25 controls the selection signal (SELECT) so that the time for the frame signal to change from "LOW" to "HIGH" exists in the stable area.

(Phase Difference Measuring Mode)

As shown in FIG. 1, it is possible, by using the same reference signal (EXT_REF) in the external synchronization mode, to grasp the phase difference between the SDI video signal from the SDI video signal generator 12A and the SDI video signal from the SDI video signal generator 12B. To visualize the phase difference in a display portion 24, the CPU 25 comprises a phase difference measuring mode. If the phase difference measuring mode is selected by a user, the SDI video signal (target signal) from the SDI video signal generator 12A is inputted to the SDI video signal processing portion 21. In the SDI video signal processing portion 21, the parallel clock (PCLK) is generated from the inputted SDI video signal. The parallel clock (PCLK) is inputted to the external reference synchronizing signal processing portion 22. The synchronizing signal processing portion 22 has the configuration shown in FIG. 6. The CPU 25 outputs the first and second selection signals (SELECT) as the fist and second initial values as described above, and then outputs the first selection signal as the first calibration value. Unlike the above-mentioned operation, the CPU 25 fixes the first and second selection signals (SELECT) after outputting the first selection signal as the first calibration value. To be more specific, even if the elapsed time gets closer to the unstable area, the CPU 25 does not control the second selection signal (SELECT) of the second selector to bring the elapsed time closer to the center of the stable area. The CPU 25 further causes the display portion 24 to visualize the positional status signal (D_FRM_STATUS) for representing where the time for the delay frame signal (D_FRM) to change from HIGH to LOW is located with reference to the rise time from LOW to HIGH of the parallel clock (PCLK) (refer to FIG. 11(a)). The CPU 25 can also cause the display portion 24 to visualize a range of the stable area 120.

The input to a SDI video signal waveform display apparatus 20 is switched by the user from the SDI video signal (target signal) of the SDI video signal generator 12A to the SDI video signal (adjustment signal) of the SDI video signal generator 12B. At that time, the CPU 25 stores the positional status signal (D_FRM_STATUS) on the SDI video signal generator 12A in a memory (not shown) for instance. Thereafter, the SDI video signal (adjustment signal) from the SDI video signal generator 12B is inputted to the SDI video signal processing portion 21. The CPU 25 causes the display portion 24 to visualize the positional status signal (D_FRM_STATUS) on the SDI video signal generator 12B (refer to FIG. 11(b)). If the elapsed time exists in the unstable area at this time, the CPU 25 causes a HIGH status of the positional status signal (D_FRM_STATUS) on the video signal generator 12B to be displayed in red. Or else, if the elapsed time exists in the stable area, the CPU 25 causes the HIGH status of the positional status signal (D_FRM_STATUS) on the video signal generator 12B to be displayed in green. As shown in FIG. 11(b), it is possible for the user, by displaying the positional status signal (Ach) on the SDI video signal generator 12A and the positional status signal (Bch) on the SDI video signal generator 12B, to grasp the phase difference between the SDI video signal from the SDI video signal generator 12A and the SDI video signal from the SDI video signal generator 12B with a resolution of the parallel clock (PCLK) or lower. For instance, if the phase of the SDI video signal outputted from the SDI video signal generator 12B is adjusted by using a phase adjusting means (not shown) of the SDI video signal generator 12B to find out that the number of the HIGH statuses of the positional status signal (Ach) on the SDI video signal generator 12A is the same as that of the positional status signal (Bch) on the SDI video signal generator 12B, the user can recognize that there is no longer any phase difference between the SDI video signal (target signal) of the SDI video signal generator 12A and the SDI video signal (adjustment signal) of the SDI video signal generator 12B.

Figure 12:
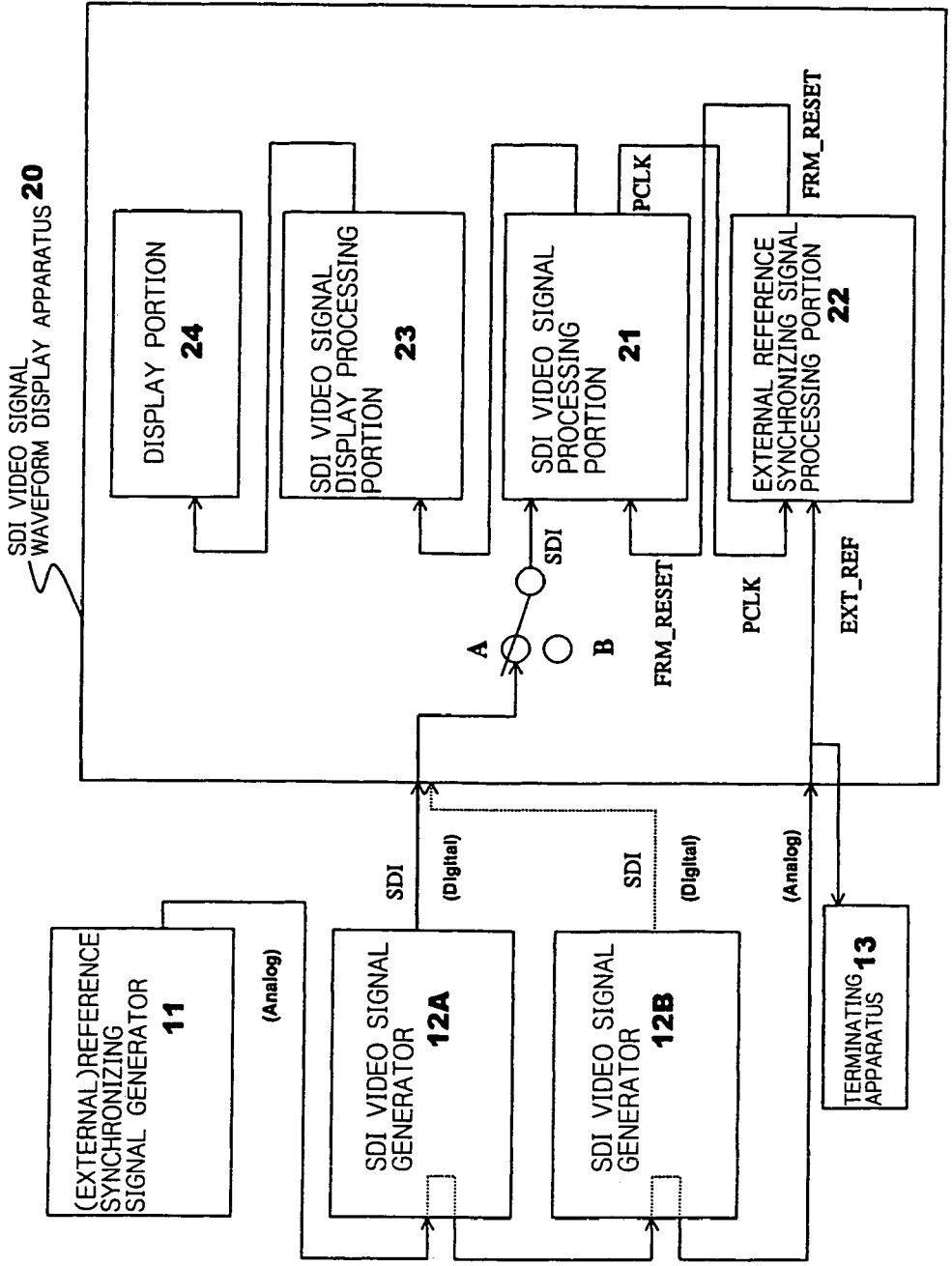
FIG. 12 shows an example of a case where both the SDI video signal from a video signal generator 12A and the SDI video signal from a video signal generator 12B are inputted from Ach.

FIG. 12 shows an example of a case where both the SDI video signal from the SDI video signal generator 12A and the SDI video signal from the SDI video signal generator 12B are inputted from Ach. The CPU 25 fixes the first and second selection signals (SELECT) when outputting the first selection signal as the first calibration value. The CPU 25 causes the display portion 24 to visualize the positional status signal (D_FRM_STATUS) on the target signal (the SDI video signal from the video signal generator 12A) (refer to FIG. 13(a)). Thereafter, the CPU 25 causes the display portion 24 to display a store button (not shown). If the user touches the store button, the CPU 25 stores the positional status signal (D_FRM_STATUS) on the video signal generator 12A in the memory (not shown) for instance. Thereafter, the SDI video signal (adjustment signal) of the SDI video signal generator 12B is inputted by the user to Ach of the video signal waveform display apparatus 20 instead of the SDI video signal (target signal) of the SDI video signal generator 12A. The SDI video signal (adjustment signal) from the SDI video signal generator 12B is inputted to the SDI video signal processing portion 21. The CPU 25 causes the display portion 24 to visualize the positional status signal (D_FRM_STATUS) on the SDI video signal generator 12B (refer to FIG. 13(*b*)).

What is claimed is:

1. A frame signal phase adjuster comprising:
    first means (21) comprising: means for inputting a SDI video signal and a frame reset pulse signal; means for generating a parallel clock from the SDI video signal; means for generating parallel data based on the SDI video signal and the parallel clock; means for using the frame reset pulse signal as video output timing to output the parallel data with the parallel clock; and means for outputting the parallel clock, and
    second means (22) comprising: means for inputting the parallel clock and a reference signal; means for generating a frame signal from the reference signal; means for adjusting a phase of the frame signal; means for generating an adjusted frame signal synchronized by the parallel clock from the parallel clock and the adjusted frame signal; means for generating a frame reset pulse signal based on the parallel clock and the adjusted frame signal synchronized by the parallel clock; and means for outputting the frame reset pulse signal.

2. The frame signal phase adjuster according to claim 1, wherein:
    the means for adjusting a phase of the frame signal of the second means (22) adjusts the phase of the frame signal so that the frame signal constantly becomes HIGH or LOW through a setup time and a hold time of the means for generating the frame reset pulse signal; and
    the setup time is a predetermined first period, with reference to a rise time from LOW to HIGH of the parallel clock, from a time before the rise time to the rise time; and
    the hold time is a predetermined second period, with reference to the rise time from LOW to HIGH of the parallel clock, from the rise time to a time after the rise time.

3. The frame signal phase adjuster according to claim 1, wherein:
    the means for adjusting a phase of the frame signal of the second means (22) adjusts the phase of the frame signal so that a time at which the frame signal changes from HIGH to LOW or changes from LOW to HIGH exists in a stable area; and
    a setup time is a predetermined first period, with reference to a rise time from LOW to HIGH of the parallel clock, from a time before the rise time to the rise time;
    a hold time is a predetermined second period, with reference to the rise time from LOW to HIGH of the parallel clock, from the rise time to a time after the rise time; and
    the stable area is a period from an ending time of the hold time to a starting time of the setup time following the hold time.

* * * * *